Nov. 10, 1931.  W. J. MILLER  1,830,849
METHOD OF FEEDING GLASS AND MEANS THEREFOR
Filed May 3, 1926   6 Sheets-Sheet 1
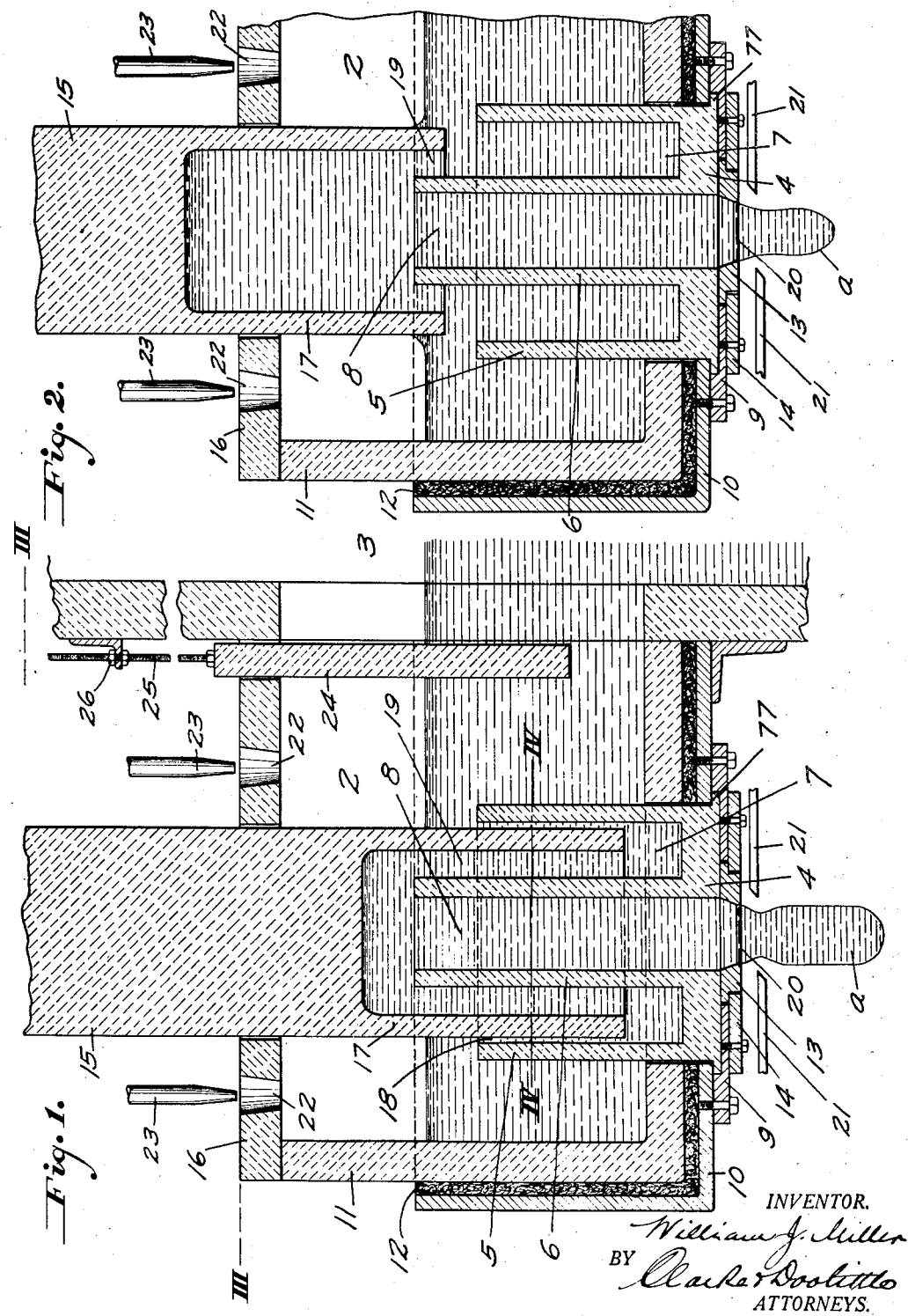
INVENTOR.
William J. Miller
BY Clarke & Doolittle
ATTORNEYS.

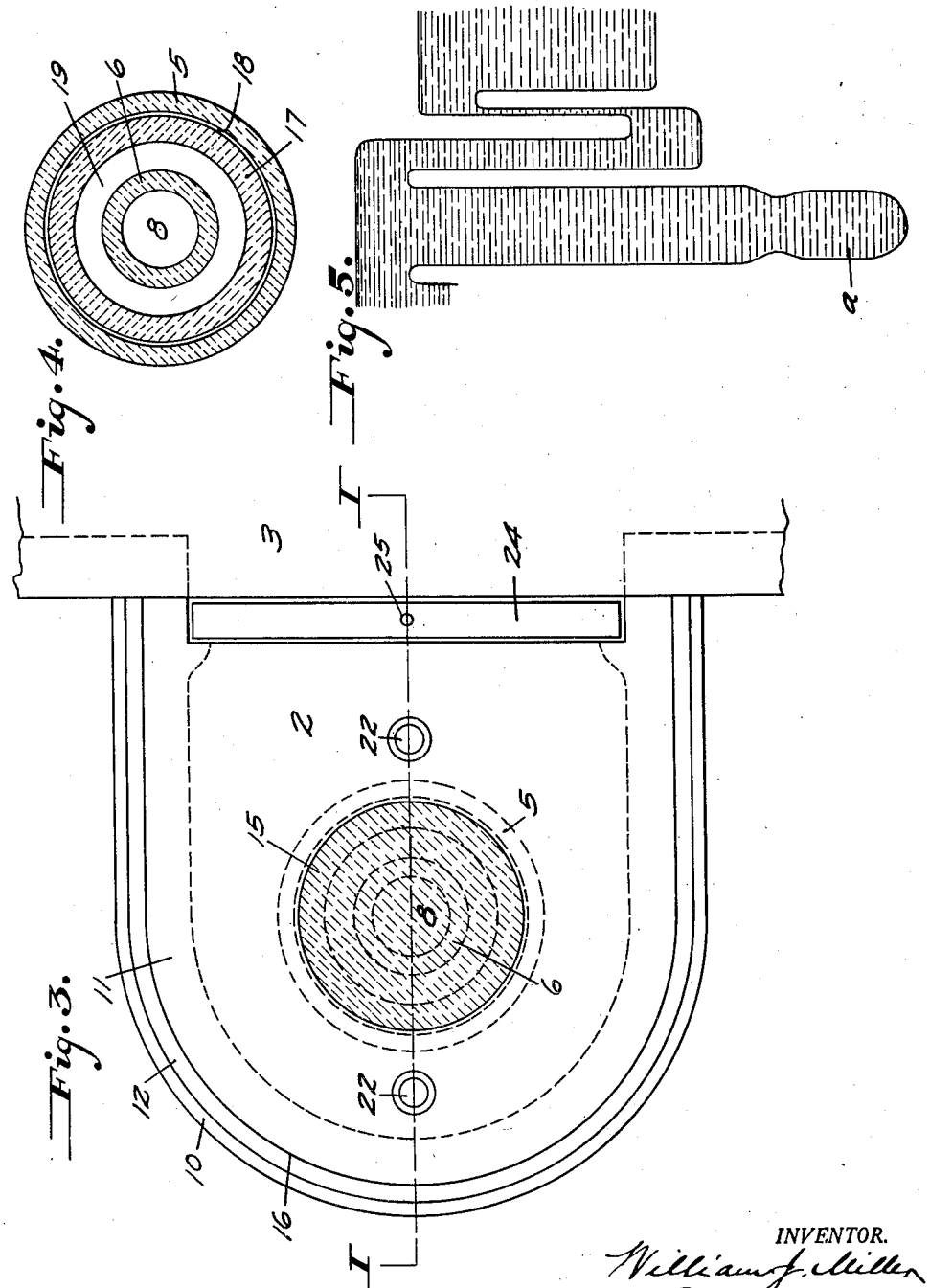

Nov. 10, 1931.  W. J. MILLER  1,830,849
METHOD OF FEEDING GLASS AND MEANS THEREFOR
Filed May 3, 1926    6 Sheets-Sheet 3
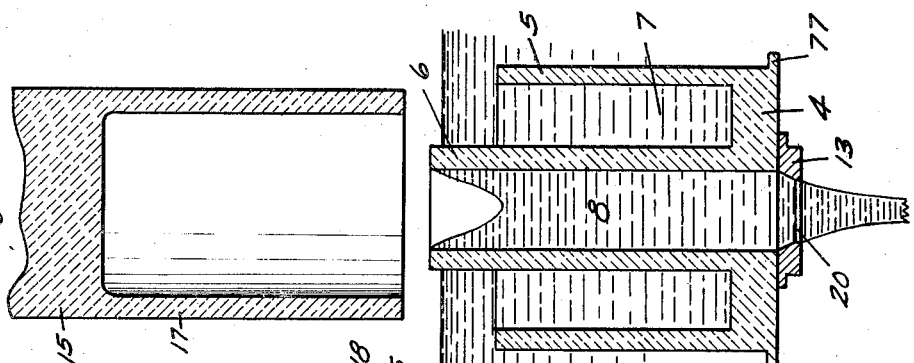
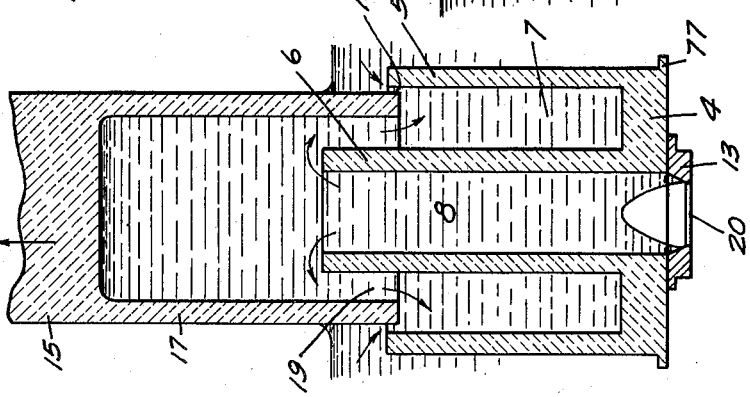
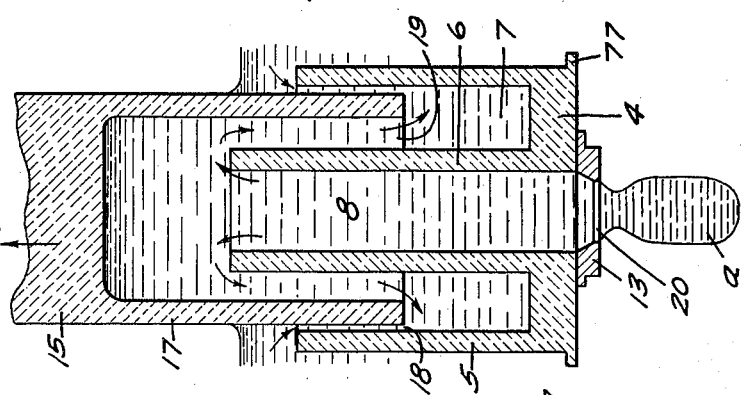
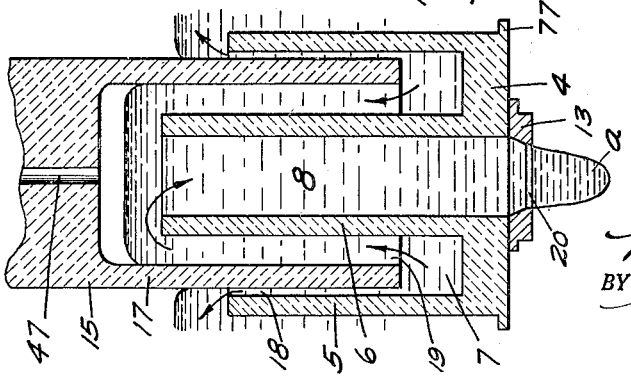
INVENTOR.
William J. Miller
BY
ATTORNEYS.

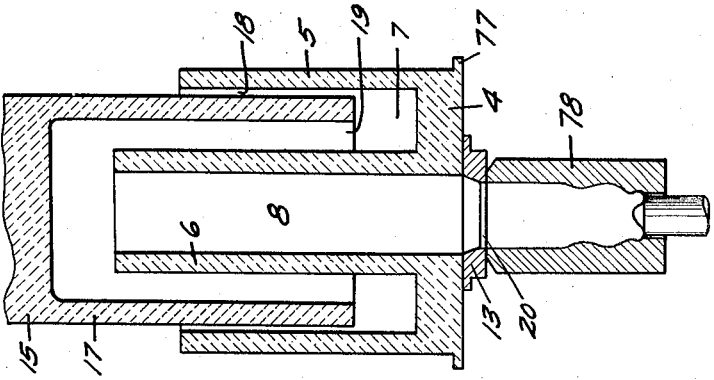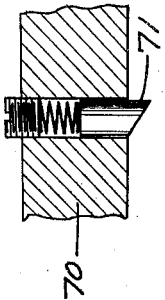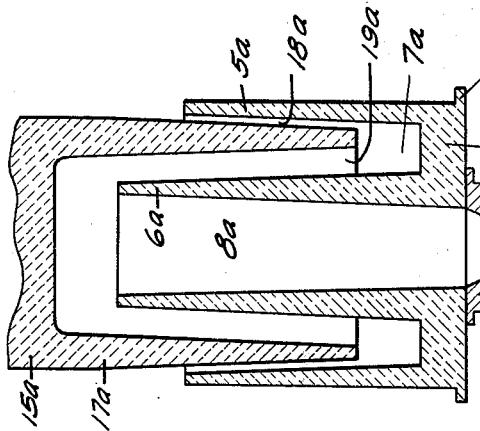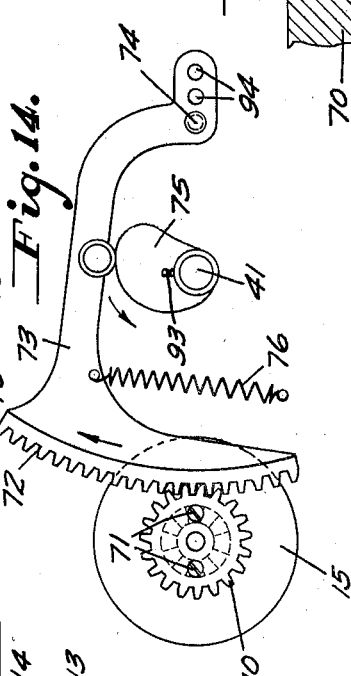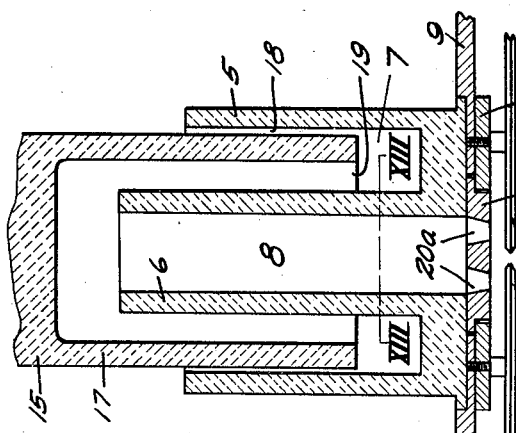

Nov. 10, 1931. W. J. MILLER 1,830,849
METHOD OF FEEDING GLASS AND MEANS THEREFOR
Filed May 3, 1926   6 Sheets-Sheet 5

INVENTOR.
William J. Miller
BY
ATTORNEYS.

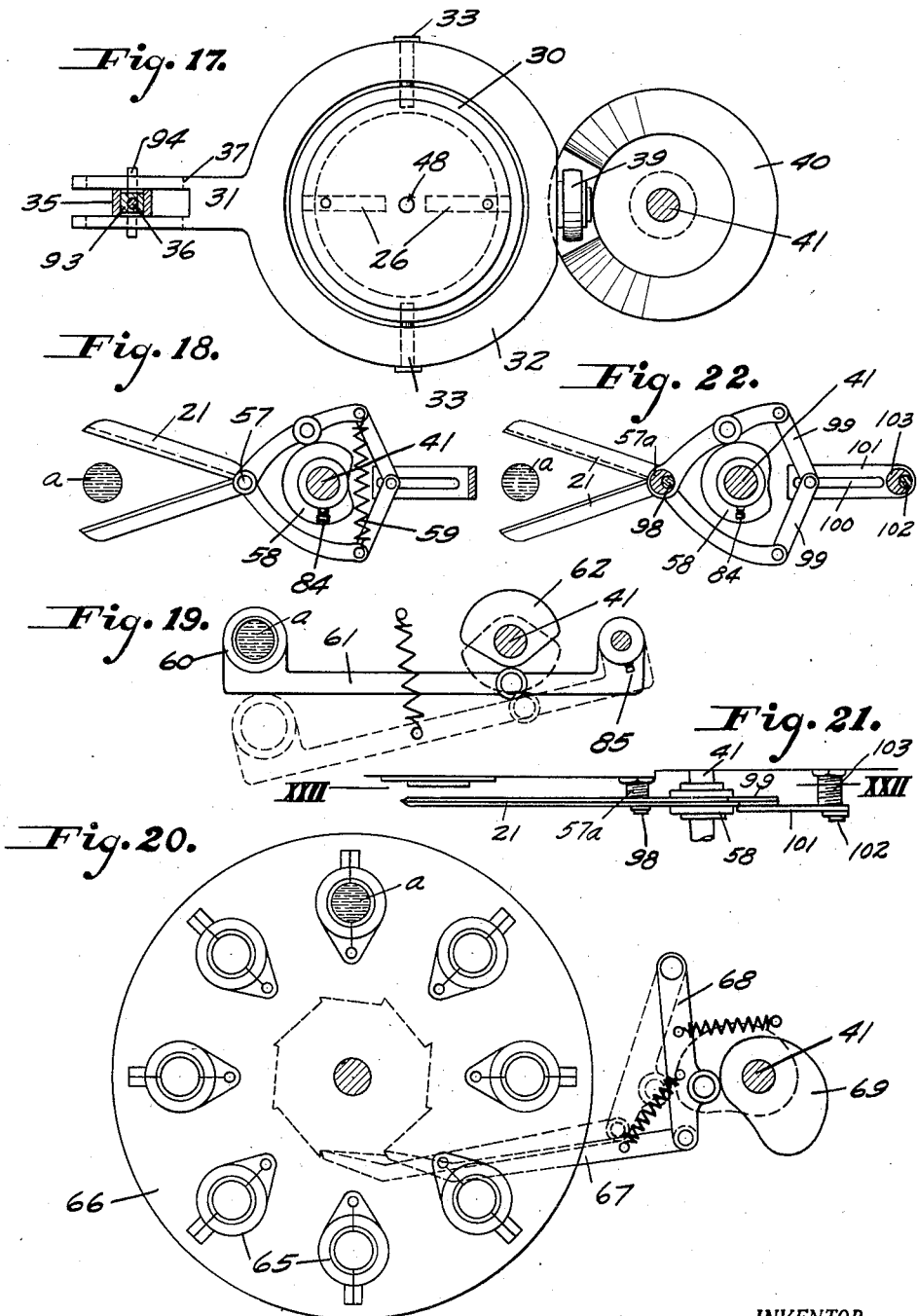

Patented Nov. 10, 1931

1,830,849

UNITED STATES PATENT OFFICE

WILLIAM J. MILLER, OF SWISSVALE, PENNSYLVANIA

METHOD OF FEEDING GLASS AND MEANS THEREFOR

Application filed May 3, 1926. Serial No. 106,235.

My invention refers to an improvement in means for feeding measured amounts of molten glass and for extracting the same from a mass, and to the method involved.

It has in view to effect such feeding indirectly but continuously from a tank or similar container by interposed, plunger actuated, intermittently operative, segregating impulse mechanism utilizing a continuous feeding channel, terminating in a central outlet or delivery conduit.

In principle, the operation involves alternating impeller actuated inflow and compression outflow through an alternating channel, preferably with incidental variation in the areas thereof, whereby to provide controlled intermittently continuous feed to the central outlet conduit, with partial throttling at the termination of each discharge.

In the embodiment of the invention illustrated, a hollow cylindrical plunger or impeller is arranged for telescoping operation within an outer submerged annular wall and around a central discharge conduit, with varying intervening circulation spaces, for the glass. Reciprocation of the plunger upwardly and downwardly effects inflow of the glass on upward movement and ejection or extrusion of a measured amount in the form of a gob on downward movement at each operation, with necking formation upon retraction of the impeller.

My invention relates generally to the production of mould charges of predetermined weight, shape, viscosity and homogeneity, generally known as gob feeding, wherein the molten glass is caused to issue from an orifice partly by gravity and partly by extrusion aiding gravity.

In the present method of feeding glass as ordinarily practiced it is customary to provide an orifice in the floor of the forehearth through which the glass is permitted to flow or be extruded, either by gravity or an impelling implement, or by gravity and an impelling instrument or by compressed air. In such type of apparatus it is impossible to stop the flow of glass except by plugging up the orifice or by lowering a dam or other obstruction in the path of the oncoming glass. Either of these systems are time consuming and unsatisfactory in practical operation. A dam freezes fast to the contacting surfaces and is often broken in removing, whereas the plug often freezes in and is difficult to remove, resulting in a broken and deformed orifice.

One of the objects of the invention is to provide a charging device that will deliver a definite and uniform weight and shape of gob regardless of the viscosity of the glass, and which will also effect a positive retraction. Another object is to provide a feeding device wherein a receiving well is provided with a delivery conduit having an inlet above the surface of the glass and terminating in a lowermost outlet or delivery orifice, in which there is normally no natural gravity flow of the glass, and when inoperative, the glass automatically ceases to flow.

In my present invention I overcome these and other objections, and also accomplish other advantages and results, by means of the mechanism illustrated in the accompanying drawings, showing certain preferred forms of apparatus, in which:

Fig. 1 is a vertical sectional view through the impeller mechanism and tank extension on the line I, I, of Fig. 3.

Fig. 2 is a similar view showing the impeller retracted.

Fig. 3 is a plan view of the tank extension or forehearth on the line III, III, of Fig. 1.

Fig. 4 is a cross sectional view on the line IV, IV, of Fig. 1.

Fig. 5 is a diagrammatic view showing in outline the path of the molten glass from the forehearth to the gob.

Figs. 6, 7 and 8 are sectional views, detached, showing the impeller mechanism in successive positions of operation.

Fig. 9 is a similar view showing the impeller provided with an air circulation port.

Fig. 10 is a similar view showing the impeller feed mechanism provided with a plurality of outlet orifices.

Fig. 11 is a similar view, showing the impeller mechanism provided with tapered walls.

Fig. 12 is a similar view, showing the impeller mechanism associated with a receiving mold.

Fig. 13 is a cross section on the line XIII, XIII, of Fig. 10.

Fig. 14 is a detail plan view showing cam actuated intermittently operating rotating mechanism for the impeller.

Fig. 15 is a sectional detail view showing a spring actuated shifting pawl for the impeller.

Fig. 17 is a sectional plan view on the line XVII, XVII, of Fig. 16.

Fig. 18 is a sectional plan view of the shears on the line XVIII, XVIII, of Fig. 16.

Fig. 19 is a plan view of a vertically and laterally movable supporting, husbanding or forming cup for the gob, on the line XIX, XIX, of Fig. 16.

Fig. 20 is a sectional plan view of the rotatable mold table, on the line XX, XX, of Fig. 16.

Fig. 21 is a view in edge elevation showing a modified adjustable mounting for the shears.

Fig. 22 is a sectional plan view of Fig. 21 on the line XXII, XXII, thereof.

Figure 16:
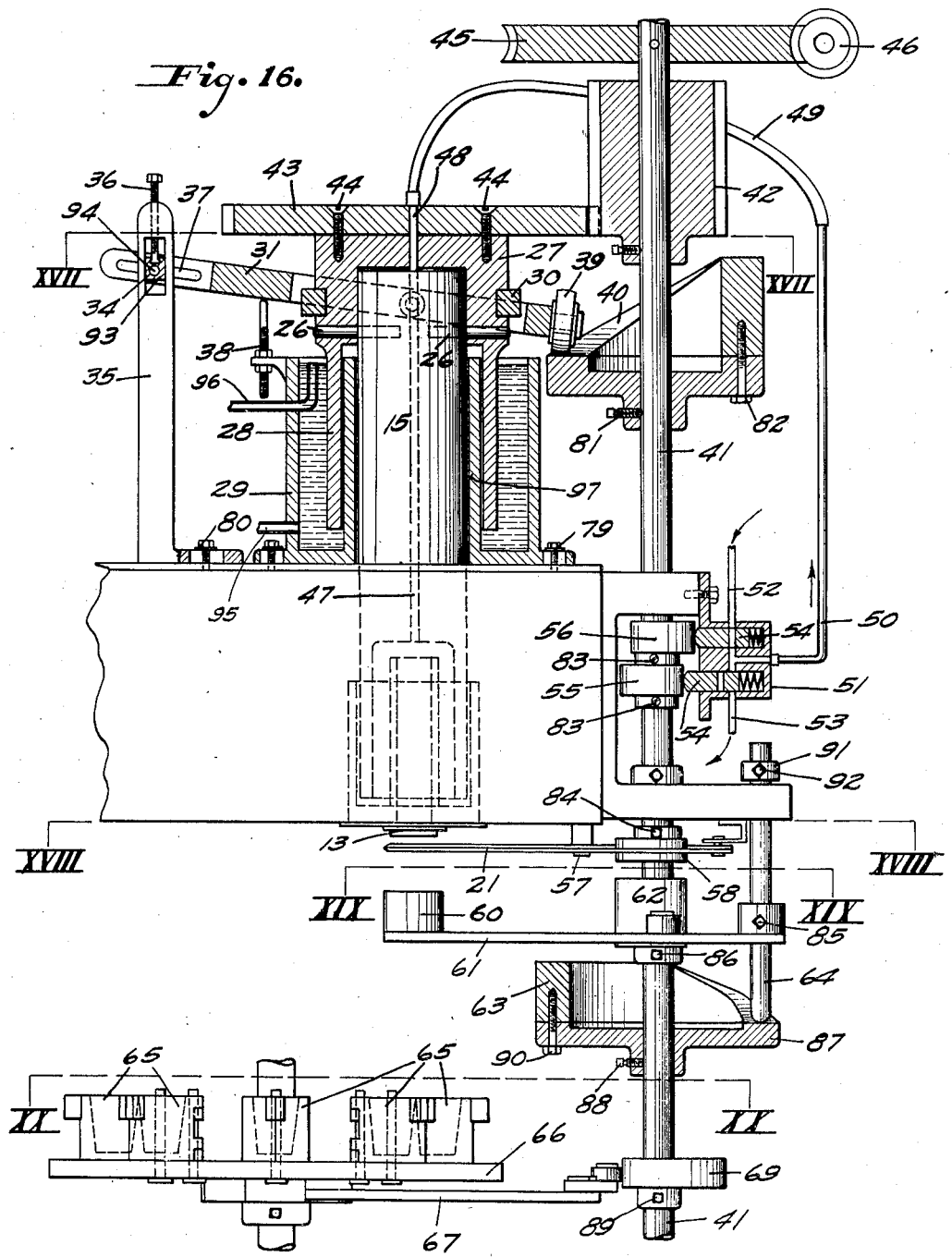
Fig. 16 is a vertical sectional view of a feeding mechanism provided with rotating and raising and lowering mechanism with associated co-acting operating parts.

Referring to the drawings, the cavity 2 of the forehearth is in continuous communication with the main furnace chamber 3 of usual construction, providing for continuous communication therebetween of the bath of molten glass, as in Fig. 1.

Extending upwardly through the bottom of the forehearth is a cylindrical casing or well having a bottom 4, an outer annular shell 5 and an inner concentric annular shell 6 with an intervening annular space 7 for molten glass in transit.

Inner shell 6 may extend somewhat above outer shell 5 as shown and provides the central outlet conduit 8, terminating in a bottom orifice 20 for delivery.

The bottom is supported by a plate 9 bolted to the main frame 10 of the forehearth 11, which is carried thereby preferably with an intervening packing 12 of suitable insulating material.

A central outlet plate 13 having an outlet orifice preferably concentric with cavity 8 and preferably tapered downwardly as shown, is secured by a supplemental plate 14 to plate 9, for easy renewal or repair.

An impeller 15 extends downwardly through the cover 16 of the forehearth, with suitable guiding and reciprocating actuating mechanism, adapted to move the impeller 15 upwardly and downwardly at regular intervals with suitable movement synchronizing and time-controlling mechanism, as hereinafter described.

The lower portion of the impeller 15 is in the form of an annular skirt or shell 17 in telescoping or interfitting relation with the annular walls 5 and 6 and with free intervening space 18 and 19 respectively between the shell 17 and outer wall 5 and inner wall 6.

The outer space 18 as shown, is comparatively restricted with relation to the inner space 19, providing for relatively freer flow of the glass through space 19 upon downward movement of the plunger.

I do not, however, limit myself to any definite relation of spaces 18 and 19, and these may be varied and adjusted to suit varying conditions of use.

Fig. 2 shows the impeller raised above the upper edge of wall 5 and for free communication to the space 7, forming a gathering well 7 for glass from the main contents of the forehearth.

Upon downward movement of the impeller, the contents of such well 7 are forced upwardly and over the top of inner shell 6, downwardly through the central conduit 8, and outwardly through the bottom orifice 20 thereof forming the exuding gob $a$, upon termination of the downward movement of impeller 15.

Upon retraction of the impeller, the downward flow of glass in conduit 8 having been arrested, an upward movement of the glass in conduit 8 is effected, providing, with gravity of the gob, for necking the gob immediately below the orifice, so that the gob 20 can be served by the usual shears 21 in the ordinary way customary in the art.

As is well understood in this art, natural necking is effected when an ordinary plunger is depressed and held so depressed until the weight of the protruding gob necks or partly ruptures it near the orifice.

Artificial necking, as practiced herein, is effected when an upward pull is applied to the glass, thereby assisting gravity to effect necking.

For the purpose of regulating temperature in the forehearth, the usual fuel or air supply jets may be introduced through openings 22 in the cover 16 from pipes 23, for introduction of a heating or cooling medium, as is commonly practiced in this art.

A vertically adjustable gate 24 is located between the main tank and the forehearth, provided with a raising and lowering connection 25 of any suitable kind. Such gate may be located at any desired height to control the flow of glass to the forehearth by adjusting nuts 26, and it also serves as a skimmer to prevent impurities on the surface of the bath from entering the forehearth.

When replacing the well 5 or for any other repair work in the forehearth, the gate 24 may be lowered to the bottom to shut off the feed temporarily.

Such replacement is facilitated by removal of the bolts of plates 9, with incidental draining of the forehearth. As shown the well is also retained against upward movement by its bottom terminal flange 77.

In operation, the impeller will be vertically reciprocated sufficiently to drive out any contained air through the open conduit 8 or through the pores of the refractory material of the impeller. Glass will flow into and fill all of the spaces intervening between the well and the impeller, first flowing from the well upwardly and into the impeller cavity and into the conduit 8, as in Fig. 2. Upon downward movement the glass will be retarded against back flow upwardly through channel 18 but will flow freely upwardly through channel 19 filling the central conduit, as in Fig. 1, with exuding discharge of the glass through the outlet port, in the form of the gob 20.

Reverse movement of the impeller upwardly produces a corresponding retraction of the column of glass in the conduit, with the customary "necking" of the gob for severance by the shears, as in Fig. 6.

The gob having been severed, the stub of the remaining glass is then drawn upwardly into the orifice as in Fig. 7, resulting in elimination of the shear scar due to reheating by refraction and radiation from the lower end of the delivery column. The impeller continues to rise to the limit of its upward movement, where it remains stationary sufficiently long for the glass to pass by siphoning action and gravity, to form a partly formed protruding gob, as in Fig. 2.

Upon further downward movement of the impeller, the formation of another exuding gob is effected, the shape and extent of which is controlled by the speed of operation, temperature, timing, etc.

At any time desired the impeller 15 may be completely withdrawn from the bath in the forehearth, breaking the seal and siphon relationship as in Fig. 8. In such case, the central conduit may be emptied of glass as indicated.

By raising the impeller above the surface of the glass, as shown, the flow through the outlet orifice automatically ceases after the column of glass in the conduit has been discharged by gravity.

At the same time, replacement of the impeller by lowering, followed by reciprocation, will cause an inflow of glass, filling the cavities and the outlet conduit ready for operation in the manner described. When the impeller is thus lowered and reciprocated, the apparatus is quickly adapted to produce normal discharges of glass.

It will be understood, of course, that the temperature of the glass surrounding the orifice and impeller may be maintained normal by the heating or cooling devices shown.

The impeller may be made as shown, either with an imperforate head or provided with the air port 47 and the suction and pressure contributing elements hereinafter described.

When no opening is provided through the impeller, its action is by adhesion and pressure, assisted by gravity, dependent somewhat on the speed at which it is operated.

On the other hand, when the opening is provided through the impeller, vacuum may be utilized either in combination with reciprocation or without it, to elevate the glass into the cavity of the impeller and also by application of air pressure to discharge it from the orifice. I prefer, however, to operate the mechanism without the aid of either sub-atmospheric, atmospheric, or super-atmospheric pressure.

Likewise, the impeller may be rotated during reciprocation or may be reciprocated without rotation, or may be utilized stationary without either rotation or reciprocation at all.

When thus used, the impeller will be always partly submerged in the glass as for instance shown in Fig. 2, maintaining a continuous stream, and atmospherically sealed so as to cause the glass to be siphoned out of the orifice. In order to start such siphoning operation, the impeller is depressed to its utmost limit in the glass as in Fig. 1, then elevated as in Fig. 2 with its lower edge submerged, after which the glass will continue to flow by siphon action through the orifice.

The extent of such flow can be regulated by elevating or depressing the impeller to increase or decrease the space between the impeller terminal and the top of the outer wall 5.

It will be evident that the impeller can also be depressed to extrude the gob and then raised to start a gob formation by gravity and completed by extrusion of the gob, or vice versa, with the assistance of gravity.

As stated, the space between the impeller and the outer annular wall 5 is preferably less than the space between the impeller and the wall 6 of conduit 8, although such conditions are not necessarily constant and may be varied to suit conditions.

It will be evident that by reciprocating the impeller in viscous material, as molten glass, even without close contact, that a pumping action to effect extrusion and retraction will result, even though there should be an extraordinary clearance.

While in the principal views I have shown the walls of the well and of the impeller as parallel-sided or straight, they or any of them may, if preferred, be flaring as in Fig. 11, indicated by the same identifying numerals with the exponent $a$.

In such construction, the refractory material is somewhat stronger and more durable and there is, to a degree, a variation in the intervening spaces, and its effect on the glass, dependent upon the relative vertical locations of the impeller.

It will be obvious also that I may install two or more sets of wells and impellers in a single forehearth to feed a series of molds on a moving mold carrier, either simultaneously or successively. Also that the gob extruded from one delivery orifice may vary from that delivered through another, dependent upon the requirements.

It is also possible, of course, to extrude a plurality of gobs from a single delivery conduit, as in Fig. 10, where the bottom plate 13 is provided with two or more individual side-by-side delivery ports 20a, of the same or different areas.

In such case, corresponding sets of shears 21 are provided for severance of each individual gob, and either individual receiving molds or cups are provided for the gobs, or a common plural cavity mold and one common shears may be used, as will be readily understood.

The extent to which the impeller is reciprocated determines the amount of glass extruded in addition to glass issuing by gravitation. I prefer to regulate the intervening annular space 18 so as to provide for accurate control of the amount of retraction exerted at the discharge orifice, and to thereby regulate and control the extent or degree to which the sheared stub is elevated up into the orifice, to eliminate or burn away the scar left by the shear, as in Fig. 7.

I have shown in Fig. 16 a general assembly view in sectional elevation illustrating cooperating mechanism for carrying out the operation, not only of producing the desired extrusion and necking of the gob, but also providing for maintenance of suction and pressure on the glass, rotation of the impeller, actuation of the shears, temporary support of the gob, molding mechanism etc., associated in operative relationship.

In such case, the well 5 is illustrated for convenience alone and without the associated forehearth, but it will be understood that it is to be arranged in relation thereto in the manner generally shown in Figs. 1, 2 and 3, with proper provision for spacing and placement of the operative mechanism.

The plunger or impeller 6 in such case is adapted for reciprocation vertically and also rotation.

For such purpose it is connected by cross pins 26 with the rotatable head 27 having a downwardly extending annular skirt or shell 28 immersed in a fluid containing bath 29, for making an air-tight and heat confining seal, as will be readily understood. Such mechanism is mounted adjustably directly above the forehearth structure, by slotted bolt connection, as at 79.

Water inlet and outlet from bath 29 is furnished by pipes 95 and 96 for preventing excessive heat in the bath.

Likewise shell 28 forms a telescoping sliding fit around the inner shell 97, thereby maintaining a vertically guiding function on plunger 15.

Head 27 is provided with an annular supporting ring 30 engaging a shouldered neck for raising and lowering of the head by the lever 31, and also providing for rotation of the head.

Ring 30 is connected at opposite sides with the annular portion 32 of lever 31 by pins 33 pivotally connected at opposite sides, providing for raising and lowering equalizing movement.

Lever 31 is pivotally mounted at 34 in the upper end of a post 35, with a suitable adjusting screw 36, providing for adjustment of the pivotal mounting, with which the end of lever 31 is in sliding slotted engagement, by slot 37.

Adjusting screw 36 is secured to block 93 by a swivel joint at its lower end for turning, raising and lowering connection with block 93 slidably mounted in the upper end of post 35.

Stud 94 of block 93 extends laterally into slots 37 for pivotal engagement therewith, and by such mounting it will be seen that very accurate adjustment is provided between the lever 31 and its support. An adjustable limiting stop 38 is provided for arresting the lever on downward movement, to control the downward limit of movement of the lever end of its roller 39.

The extent of reciprocation by lever 31 may be controlled by shifting the post 35 inwardly or outwardly, as provided by the slot and bolt connection 80.

At its other end lever 31 is provided with a roller 39 engaging cam 40 of shaft 41, by which the impeller 6 will be raised and lowered at a desired speed and extent dependent on the face of cam 40, and on the several adjusting devices, for each rotation of the shaft.

Cam 40 is adjustably mounted on shaft 41 by set screw 81, and by such adjustment and the lift of the cam itself, the desired reciprocation as well as its timing and extent, may be accurately regulated. The cam is preferably also made replaceable by the bolt connection 82, providing for a quick change when desired.

For the purpose of providing ample and accurate adjustment of the several cooperating parts above described, and for substitution, change or replacement, it will be seen that means are provided for such purpose throughout.

Thus cams 55 and 56 are individually adjustable by set screws 83.

The shear cam 58 may be secured by set screw 84, and the pivoting stem 64 and the inner hub end of cup lever 61 are similarly adjusted and secured by set screw 85.

Cam 62 is also provided with set screw 86 and the base 87 of cam 63 has a set screw 88 through its hub for the same purpose. Cam 69 is also adjustable on shaft 41 by a similar screw 89, and cam 63 is removable for quick change or substitution by bolt 90.

A collar 91 is secured on the upper end of stem 64 by an adjusting screw 92, providing for accurate limitation of the lowermost position of the rod and its lower cam engaging end.

Shaft 41 is provided with an upper elongated pinion 42 in sliding driving engagement with the gear 43 mounted on the upper end of head 27 by securing screws or bolts 44.

The shaft 41 is driven at any desired speed through worm gears 45, 46, or other suitable means, from any source of power, either geared with the machine or independent thereof.

Impeller 15, in the construction shown, is of the ported construction as in Fig. 9 and provided with an air circulation port 47 extending therethrough.

Said port is connected by stem 48 and flexible connection 49 and pipe 50 with a controlling valve casing 51.

A pressure pipe 52 leads to one side of casing 51 and a suction pipe 53 to the other side, each communicating through a ported valve 54, with the common pipe 50. Each valve 54 is actuated against a reacting spring by a cam 55 and 56 respectively on shaft 41.

During a portion of the operation, suction is maintained through pipe 53 and connections 50, 49 and 48 with the hollow interior of the impeller, while during another portion of the operation an alternating pressure is maintained independently, dependent upon the opening and closing of valves 54 by the cams. By such means the device is capable of being subjected to a retracting suction or an assisting extruding pressure for a shorter or longer period as desired, dependent upon action of the valves and adjustment of the cams 55 and 56 on the shaft, and the shape of the cams themselves.

The shears 21, which are of any suitable construction and operated by any convenient well known means, are shown as pivotally mounted underneath the outlet opening for the gob, as on stud 57, and adapted to be positively opened by a cam 58 and adapted to be yieldingly closed by closing spring 59. The shears may also be provided with suitable guiding, adjusting, and controlling mechanism, with proper timing, as is well understood in this art.

Thus in Figs. 21 and 22 I have shown means whereby the shears may be placed at the proper location vertically for operating on the desired plane of severance, and also for lateral adjustment and variation in the closing of the blades with relation to the center of the gob.

In such construction the pivoting stud 57a is threaded and provided with a lock nut so that it may be screwed upwardly or downwardly in its holding frame, and locked against movement.

A lower terminal stud 98 eccentrically located with relation to the main holding stud 57a provides a pivoting bearing for the shear blades, on which they are carried for opening and closing movement.

The shears are actuated by cam 58 as described, and are guided by the connecting links 99 and their connecting stud, engaging the guiding slot 100 of bracket 101. Said bracket is similarly mounted on an eccentrically located stud 102 of a threaded stem or bolt 103, like bolt 57a.

By such mounting, it will be seen that the height of the shear mechanism may be varied within any desired limits so as to change the level of the shearing plane through the gob, by merely raising or lowering the threaded supporting bolts 57a and 103. Also that upon rotation of either bolt, the eccentrically located stud 98 or 102 may be accurately placed to throw the longitudinal center of the shear mechanism into or out of alinement with the center of the cam shaft 41 and the center of the gob discharge opening.

By throwing one or both of the eccentric studs out of such alinement, it will be seen that the shear blades may be so controlled as to close on the neck of the gob at one side or the other of its center, which operation is desirable under certain conditions in connection with the depositing of the gob, etc.

I have also shown a receiving cup 60 mounted on the end of swinging arm 61 adapted to be swung laterally by cam 62 on shaft 41, with raising and lowering of the cup by cam 63 engaging pivoting stem 64. It will be understood of course that any other well known cup commonly used in the art may be substituted for the one shown.

The construction and operation of such receiving cup is well understood, serving to pre-shape and temporarily support the gob during its formation and prior to severance, and being swung outwardly for clearance and reception of the gob in one of a series of molds 65.

Said molds are of any suitable construction preferably mounted upon an intermittently rotatable table 66 actuated by pawl 67 of lever 68 under the control of cam 69 of shaft 41.

Spring retracting mechanism and other necessary detail features of the table, or other portions of the mechanism above described, are provided in the usual way for its normal operation, as is generally well understood. The particular construction or actuation of the table or its molds is unimportant, and within the control of the builder.

I show in Fig. 14 a modified arrangement for rotation of the impeller intermittently in one direction, providing for alternating rest periods.

In such construction a ratchet gear 70 is rotatably mounted above the impeller 15 and is provided with a pair of spring pressed pawls 71. These are adapted to engage an annular series of square faced notches in the top of the impeller, for rotation in one direction, or by reversal of the pawls, in the other direction.

By reversing one of the pawls one half rotation, the pawls will act to lock the gear 70 to the impeller, for alternating reciprocation thereof.

An annular rack 72 of arm 73 pivoted at 74, is operated by cam 75 of shaft 41, and retracted by spring 76. Such construction and partial rotation of the impeller is effected by each rotation of the cam, the shape of which may be suitably designed to meet the desired conditions.

The cam 75 is adjustably mounted on shaft 41 by a set screw 93 to provide for change of cams or adjustment of the cam for varying the time of starting, continuance, and stopping of the rotation of the impeller when desired.

Likewise the extent of rotation by the gear 72 may be varied within a limited degree by providing a series of pivoting holes 94 for the pin 74.

Fig. 12 shows a mold 78 of any suitable form which may be adjusted to the outlet orifice of conduit 8, against its lower end. In such case the glass may be discharged into the mold by gravity and the downward travel of the impeller, either or both.

While I prefer to make the well, its conduit, and the impeller circular in cross section, it may of course be made otherwise, to provide for a corresponding circulation, action, and reaction of the glass.

Likewise the top rim of the well 5 and of the conduit 6 may be sloped, with the lowest side remote from the tank supply, or with the highest side towards the hottest portion of the glass, to facilitate a freer flow from the colder side.

The extent to which the conduit extends above the surface of the glass may be regulated to suit the conditions, as well as the submersion and shape of the top of the ring 5, and the depth of cavity 7, these proportions being optional with the builder and user. Also, the outlet bushing 13 may be changed as to its central opening, and a plurality of such bushings may be provided with varying diameters and tapers, and are easily replaceable by removal of the flanged plate 14, for adaptation to the size, etc., of the gob desired.

In the operation of the apparatus it is generally preferable to elevate the impeller at a slower speed than that at which it is caused to descend. This permits glass to be drawn through the space 18 on upward movement of the impeller to an extent sufficient to prevent excessive retraction of the stub into the orifice.

In ascending, the impeller overcomes the gravity pull of the glass in the discharge conduit and thereby accelerates the inflow of glass through the space 18 from the forehearth.

The speed at which the impeller is reciprocated either upwardly or downwardly, must be regulated to suit conditions. I prefer to elevate the impeller more rapidly on its initial upward travel, and then more slowly for the balance of the upward stroke.

Likewise in descending I prefer to depress it at a higher and gradually accelerated speed for the entire stroke to maintain the diameter of the gob and to give it a shearable neck at the sudden termination of its downward travel, or reversal of movement.

However, I do not wish to be limited to such or any definite or pre-arranged speed or speeds of movement, as it may be desirable in making especially long gobs, to gradually increase the speed of the downward travel as it progresses, to maintain the speed of extrusion in proportion to the gravity pull exerted by the protruded gob to maintain its diameter.

These and other details of operation are merely matters of adaptation and use, depending on the skill of the operator in adjusting the device to obtain the results desired, and on the presence or existence of other controlling factors.

Due to the extreme difference in viscosity and speed of operation at which the apparatus must be operated on various lines of ware, it is impossible to definitely state just how the apparatus should be operated in every case, and it is to be understood that no definite normal operation can be designated or continuously followed.

It will be obvious that any of the well known types of glass severing or shearing mechanism can be employed, and that any of the well known methods of reciprocating or rotating the impeller may be used, or of controlling the extent or altitude of reciprocation, its speed, and the dwell at either end of upward or downward reciprocation, as desired.

Also that the invention is not in any way limited to any particular proportions, dimensions, or size, and may be changed or varied in these or other respects to suit conditions and within the judgment of the designer or builder.

What I claim is:

1. Means for feeding glass from a mass consisting of a conduit extending upwardly through, and to a point above the normal level of, the mass having an upper inlet opening and a lower delivery opening, and a co-acting impeller adapted to be reciprocated to effect flow into said conduit and outwardly therefrom.

2. Means for feeding glass from a mass consisting of a conduit extending upwardly through the mass having an upper inlet opening extending above the level of the mass and a lower delivery opening, and a co-acting impeller adapted to effect flow into said conduit and outwardly therefrom.

3. Means for feeding glass from a mass consisting of a conduit extending upwardly through the mass having an upper inlet opening above the normal level of the mass and a lower delivery opening, and co-acting periodically reciprocating impeller surrounding the conduit.

4. Means for feeding glass from a mass consisting of a conduit extending upwardly through the mass having an upper inlet opening above the normal level of the mass and a lower delivery opening, and a co-acting periodically reciprocating impeller having an inverted cup surrounding the conduit.

5. Means for feeding glass from a mass consisting of a conduit extending upwardly through the mass having an upper inlet opening above the normal level of the mass and a lower delivery opening, and a co-acting periodically reciprocating impeller having an inverted cup surrounding the conduit and means for varying the internal pressure thereof.

6. Means for feeding glass from a mass consisting of a conduit extending upwardly through the mass having an upper inlet opening above the normal level of the mass and a lower delivery opening, and a co-acting periodically reciprocating impeller having an inverted cup surrounding the conduit providing an upwardly extending air tight cavity within the impeller.

7. Means for feeding glass from a mass consisting of a conduit extending upwardly through the mass having an upper inlet opening above the normal level of the mass and a lower delivery opening, and a co-acting periodically reciprocating impeller having an inverted cup telescoping the conduit providing an upwardly extending air tight cavity within the impeller and means for varying the air pressure in said cavity.

8. The combination with a glass container, of a submerged receiving well in the container having an outer shell and a central conduit formed by spaced annular walls which project upward from the floor of the container, and an impeller adapted to reciprocate between said conduit and shell.

9. The combination with a glass container, of a submerged receiving well in the container having an outer shell and a central conduit formed by spaced annular walls which project upward from the floor of the container and an impeller having a depending shell surrounding the conduit within the well and adapted to reciprocate between the shell of the well and said conduit.

10. The combination with a glass container, of a submerged receiving well in the container having an outer annular shell and a central conduit formed by spaced annular walls which project upward from the floor of the container, an impeller adapted to reciprocate between said shell and conduit, and means for rotating said impeller.

11. The combination with a glass container, of a submerged receiving well having a central conduit, and an outer upwardly extending wall spaced therefrom providing an intervening circulation cavity, and an inverted cap shaped impeller extending between the wall and conduit, with means for rotating it.

12. The combination with a glass container, of a submerged receiving well having a central conduit, and an outer upwardly extending wall spaced therefrom providing an intervening circulation cavity, and a reciprocable inverted cup shaped impeller extending between the wall and conduit, with means for rotating it.

13. The combination with a glass container, of a well extending upwardly therein having an outer wall and an inner concentric delivery conduit extending above the outer wall.

14. The combination with a glass container, of an upwardly extending cup shaped well having a floor and an outer annular wall, a central delivery conduit projecting upwardly from the floor of the well and spaced inwardly from said outer wall, and an inverted reciprocable and rotatable impeller having a wall operable between the outer annular wall and the conduit and variably spaced with relation thereto.

15. The combination with a glass container, of an upwardly extending cup shaped well having a floor and an outer annular wall, a central delivery conduit projecting upwardly from the floor of the well spaced inwardly from said outer wall, and an inverted reciprocable and rotatable impeller having a wall extending downwardly between and spaced from the outer wall and the conduit, the space between said impeller wall and the outer wall being relatively reduced.

16. The combination with a glass container, of an upwardly extending cup shaped well having a floor and an outer annular wall, a central delivery conduit projecting upwardly from the floor of the well spaced inwardly from said outer wall, and an inverted reciprocable and rotatable impeller having a wall extending downwardly between and spaced from the outer wall and the conduit, the space between said impeller wall and the conduit being relatively enlarged to provide for free upflow of glass.

17. The combination with a glass container, of an upwardly extending cup shaped well having an outer annular wall, a central delivery conduit spaced inwardly therefrom, and an inverted reciprocable and rotatable cup-shaped impeller having a wall operable between the outer annular wall and the conduit, the walls of said conduit and impeller being tapered.

18. In glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for raising and lowering the impeller, and means for rotating it.

19. In glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for exhausting air from the interior of the impeller, and means for raising, lowering and rotating it.

20. In glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for supplying air to the interior of the impeller, and means for raising, lowering and rotating it.

21. In a glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for raising and lowering the impeller to effect extrusion of a gob, and means for severing the gob.

22. In glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for raising and lowering the impeller to effect extrusion of a gob, and means for severing the gob at varying levels.

23. In glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for raising and lowering the impeller to effect extrusion of a gob, and shear mechanism provided with vertical adjusting mechanism therefor.

24. In glass feeding mechanism, the combination of a double wall chamber having a central downwardly delivering conduit, the walls of said chamber projecting upwardly into the glass and being spaced apart to provide a circulation cavity therebetween, of a co-operating impeller having a cup shaped extension adapted to enter said chamber in telescoping relation to said conduit, means for raising and lowering the impeller to effect extrusion of a gob, and shear mechanism provided with lateral adjusting mechanism therefor.

25. In glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for raising and lowering the impeller to effect extrusion of a gob, shear mechanism, and a receiving cup.

26. In glass feeding mechanism, the combination of a double wall chamber having a central downwardly delivering conduit, the walls of said chamber projecting upwardly into the glass and being spaced apart to provide a circulating cavity therebetween, of a co-operating impeller having a cup shaped extension adapted to enter said chamber in telescoping relation to said conduit, means for raising and lowering the impeller to effect extrusion of a gob, shear mechanism, and means for actuating it, and a co-operating receiving cup and means for moving it into and out of position below the shears.

27. In glass feeding mechanism, the combination with a forehearth, of a reciprocable impeller projecting into the forehearth, said impeller and forehearth being provided with cooperating telescoping walls having a working fit, which function to guide the impeller during reciprocation in the forehearth.

28. In glass feeding mechanism, the combination with a forehearth, of a reciprocable impeller projecting into the forehearth, said impeller and forehearth being provided with cooperating telescoping walls having a working fit, which function to guide the impeller, and means for cooling said walls and sealing the forehearth around the impeller.

29. In glass feeding apparatus, the combination with a forehearth, of a reciprocable impeller projecting into the forehearth, the wall of the forehearth being provided with a member having a wall projecting at right angles therefrom and the impeller being provided with a cooperating wall having a telescoping action and a sliding fit relatively to said projecting wall, to guide the impeller during reciprocation in the forehearth.

In testimony whereof I hereunto affix my signature.

WILLIAM J. MILLER.